Nov. 23, 1971    J. J. DAY ET AL    3,621,710

MEASURING VELOCITIES IN MULTIPHASE SYSTEMS

Filed Sept. 26, 1969                6 Sheets-Sheet 1

INVENTORS.
JOHN J. DAY
WILFRED R. McLEOD
DONALD F. RHODES

United States Patent Office 3,621,710
Patented Nov. 23, 1971

3,621,710
MEASURING VELOCITIES IN MULTIPHASE SYSTEMS
John J. Day, Pittsburgh, Pa., Wilfred R. McLeod, Houston, Tex., and Donald F. Rhodes, Pittsburgh, Pa., assignors to Gulf Research & Development Company, Pittsburgh, Pa.
Filed Sept. 26, 1969, Ser. No. 861,383
Int. Cl. G01f 1/00
U.S. Cl. 73—194
16 Claims

ABSTRACT OF THE DISCLOSURE

Methods and apparatus to measure the velocities of all or selected ones of the components of a multicomponent material transmission system. Radioactive tracers, each compatible with only one component in the system, are utilized. Various electronic embodiments to handle the data, means to clamp the detectors to a pipeline, and means to inject radioactive gaseous and liquid tracers are disclosed.

---

This invention relates to velocity measurement, and more particularly it concerns methods and apparatus to simultaneously measure the individual velocities of all or selected ones of the several components in a moving multicomponent system.

More particularly, by way of example, pipelines are widely used in the petroleum industry to transport various products which may be gaseous or liquid, or, less frequently, solid, and combinations of materials in different states. For example, in offshore petroleum production, both liquid and gaseous products are very frequently produced together, and may be transported by a single pipeline simultaneously. Heretofore, the designing of such transportation systems has been largely based on experience.

It is a primary object of the present invention to provide means to measure the individual velocities of the various components in a multicomponent stream and to do so simultaneously. The invention has utility from a scientific viewpoint in that it will provide data on the performance of existing systems to aid in designing of more optimum future systems. In addition, the invention has utility in "on-line" service in that it could be used to selectively monitor a flow of dissimilar materials in any industrial process.

The underlying concept of the invention is the utilization of a number of different radioactive tracers each compatible with only one component in the multicomponent stream, the speed of which component it is desired to measure. When necessary, the radioactive tracers can be so selected that the energy levels of the gamma radiation they emit are substantially different from one another thereby minimizing the possibility of interference in the data produced. Proper choice of tracers will simplify the matehmatics and radiation detection electronics needed to resolve the counting rate data. For example, in a flowing stream in a pipeline containing natural gas and crude oil, radioactive argon 41 has been used as the tracer for the gaseous component, and radioactive bromide 82 in bromobenzene has been used as the tracer for the liquid component. In other tests, radioactive krypton-85 has been used for gaseous components.

The invention comprises means to insert the radioactive tracers into the flowing stream with virtually no disruption of conditions in the stream. The invention further comprises several different embodiments of electronic apparatus cooperable with the detectors to determine the speed of any particular component. In its most general sense, the invention is adaptable for use with a system containing any number of components of different pumpable materials. For example, in a pipeline carrying pulverized coal, some of the coal itself could be made radioactive to act as the tracer. In other applications, the invention could be used with a solids/liquid, or a solids/gaseous, or multi-liquid, such as oil and water, or other system, so long as the various components maintain integrity with respect to each other and each tracer selected is compatible with only one component in the multicomponent system.

Dyes have been used heretofore to measure linear velocities of single components. This method suffers from two serious disadvantages, namely, it requires a viewing window in the pipe, and it cannot be used with opaque or very dark color streams.

The above and other advantages of the invention will be pointed out or will become evident in the following detailed description and claims, and in the accompanying drawing also forming a part of the disclosure, in which:

Figure 1:
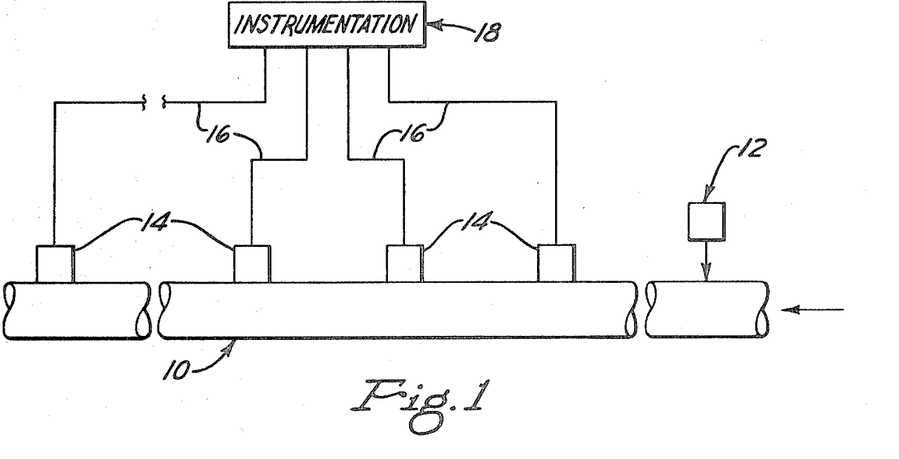
FIG. 1 is an overall schematic diagram illustrating the methods and apparatus of the invention.

Referring now in detail to the drawing and in particular to FIG. 1, 10 designates a part of a pipeline which carries a multi-component stream the individual component velocities of which it is desired to measure simultaneously. For example purposes, and to describe the tests of the invention which have been successfully completed, the following will refer to a two component system consisting of liquid and gaseous petroleum products moving in a pipeilne.

Assume that the flow of the gas/liquid stream through pipe 10 is from the right to left. Injection means 12 are provided at the right or upstream end of pipe 10. A plurality of detector assemblies 14 are spaced along pipe 10, four being shown by way of example only. It will be understood that fewer or more detectors 14 may be utilized depending upon a balance between costs, the nature of the components and their combination together, and the accuracy desired, among other items. In the most general form, only two detectors are required. A cable 16 connects each detector assembly 14 to instrumentation 18 which utilizes the signals produced by the detectors to determine the speeds of the components of the stream flowing in pipe 10. Various embodiments of the instrumentation may be utilized, as will appear in more detail below. The showing of a straight level pipeline is by way of example only. The invention can be used with a pipe going around turns, up and down hills, under water, in mud, or anywhere else, so long as access can be had for attaching the detectors. As is known by those skilled in the art, when needed, some space can be left between the pipe and the detectors. As the space increases, the radioactivity of the radiotracers must be increased, the limits being defined by safety considerations, and the particular conditions under which the work is being done.

Figure 2:
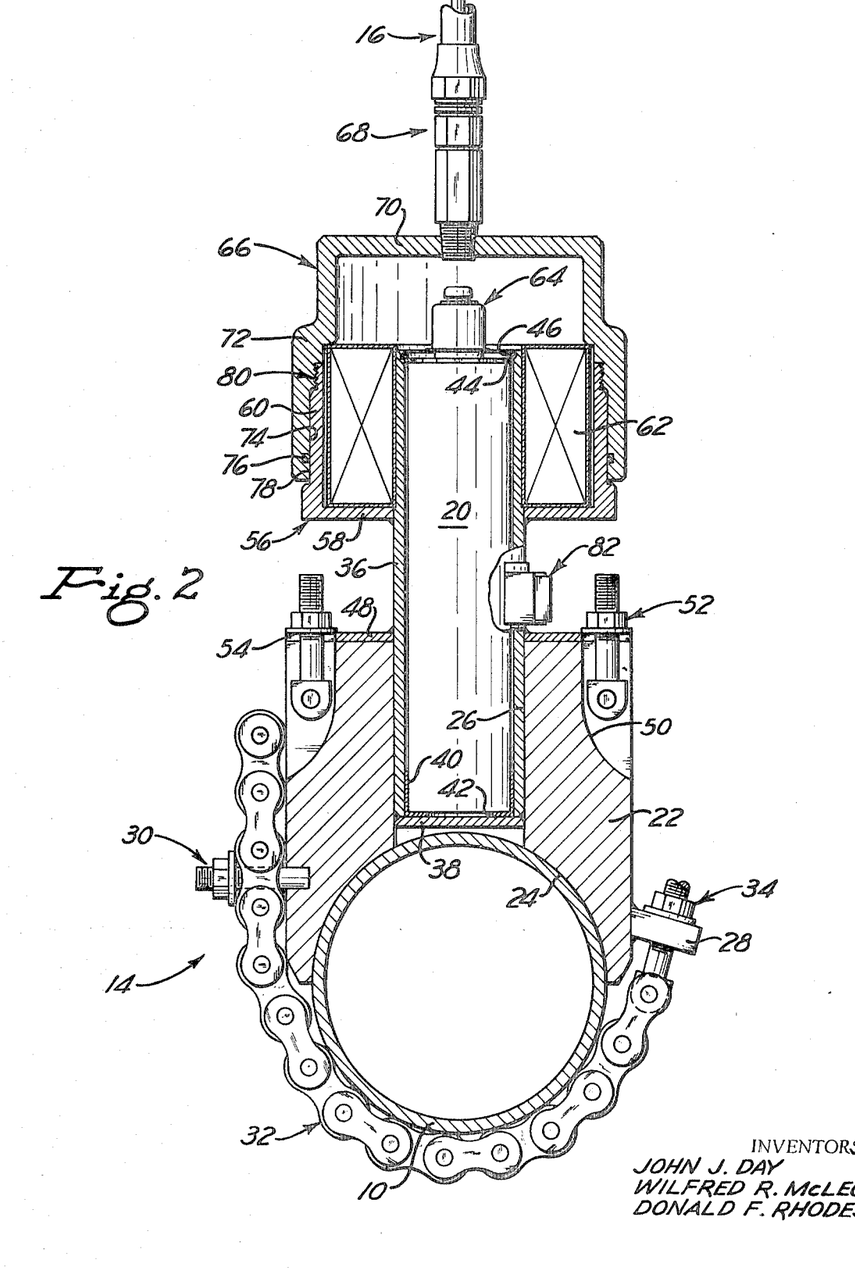
FIG. 2 is a cross-sectional view through a detector assembly.

Referring now to FIG. 2, a detector assembly 14 is shown in detail mounted on pipeline 10. The essential purpose of the detector assembly 14 is to hold a suitable scintillation counter 20 in closely spaced relation to pipe 10 so that the counter may pick up the radioactive emissions from the tracers in the stream. Detector assembly 14 comprises means to hold the assemblage onto the pipe, and to shield the area around the counter 20 to protect personnel and to direct the radioactive emissions into the scintillation counter. To this end, a block 22 of suitable material, such as steel, is formed with a cutout 24 at one end to snugly receive the pipe 10, and with a through opening 26 to receive the scintillation counter. An anchor block 28 is fixed to main block 22 on one side of pipe 10, and an anchor stud assembly 30 is fixed to the block 22 on the opposite side from anchor block 28. A chain 32 is provided with a stud and adjusting nut assembly 34 at one end thereof for cooperation with anchor block 28. Thus, detector assembly 14 can be mounted on various size pipes, within reasonable limits, by selecting a suitable position on chain 32 to pass over anchor stud assembly 30, and by adjusting to a snug fit by manipulation of assembly 34 against anchor 28.

Means are provided to power the scintillation counter 20, to protect it, and removably mount it in the through opening 26 in block 22. To these ends, a tubular counter carrying sheath 36 is provided, having a suitable "window" 38 at the end thereof closest pipe 10 to permit the radioactive emissions to pass freely into the counter 20. The end member 38 may be formed of steel. A protective cap 40, formed of polyethylene or the like, having a central opening 42 therein, is provided at the front end of counter 20. At its other end, the counter is held within counter sheath 36 by means of an annular cap member 44 and a retaining ring 46 seated in a suitably formed groove in sheath 36. Means are provided to mount the detector and its associated parts on the main block 22. To this end, a plate 48 is joined to the outside surface of sheath 36 by any suitable means such as a weld bead. The configuration of plate 48 is such as to match that of the main block 22. Block 22 is formed with a plurality of cut-outs 50, in each of which is rotatably mounted a swing bolt and locking nut assembly 52. The plate 48 is formed with slots 54 to receive the swing bolt assembly 52. Thus, the scintillation counter and its associated parts may be easily removed from the main mounting block 22 by loosening the swing bolts and swinging them out of their slots 54 in the plate 48, and then simply sliding sheath 36 out of through opening 26.

Means are provided to supply power to the scintillation counter and to make the necessary connections between each cable 16 and the counter 20 proper. To this end, an annular cup-like housing 56 is fixed, as by welding, to sheath 36 by the inner end of its annular wall 58. The cylindrical wall 60 of member 56 is of a larger diameter than the outside of sheath 36, to provide a torus-shaped space therebetween in which is mounted a suitable power source 62 which preferably comprises an array of batteries, having a total voltage selected to be compatible with the particular scintillation counter in use. The commercial counter 20, described in the table below, includes an electrical stud assembly 64. The electrical interconnections between battery pack 62 and cable 16 with the counter 62 are not shown for the sake of clarity.

A cap member 66 is provided for cooperation with a housing 56 to protect the counter stud 64 and the battery pack 62 and to provide a location for attachment of the hose coupling assembly 68 within which passes cable 16. The annular end wall 70 of cap 66 is provided with a suitable threaded opening to receive the couplings 68. The cylindrical wall 72 of the cap is provided with an inner cylindrical face 74 in which is mounted an O ring 76, both of which cooperate with a cylindrical face 78 formed on wall 60 of member 56. A threaded joint 80 is provided between cap 66 and end member 56.

Means are provided to calibrate the counter and electronics prior to use. To this end, a source assembly 82 is fixed to the outside of sheath 36 between plate 48 and member 56. Calibration source 82 provides a known output against which the counter and the instrumentation described below are calibrated, all in well known manner.

In certain applications wherein it is desired to use the invention on underwater pipelines, the detector assembly shown in FIG. 2 and described above has been found to be waterproof so long as the various welds are properly made, and the O ring seal 76 is maintained.

Figures 3, 5:
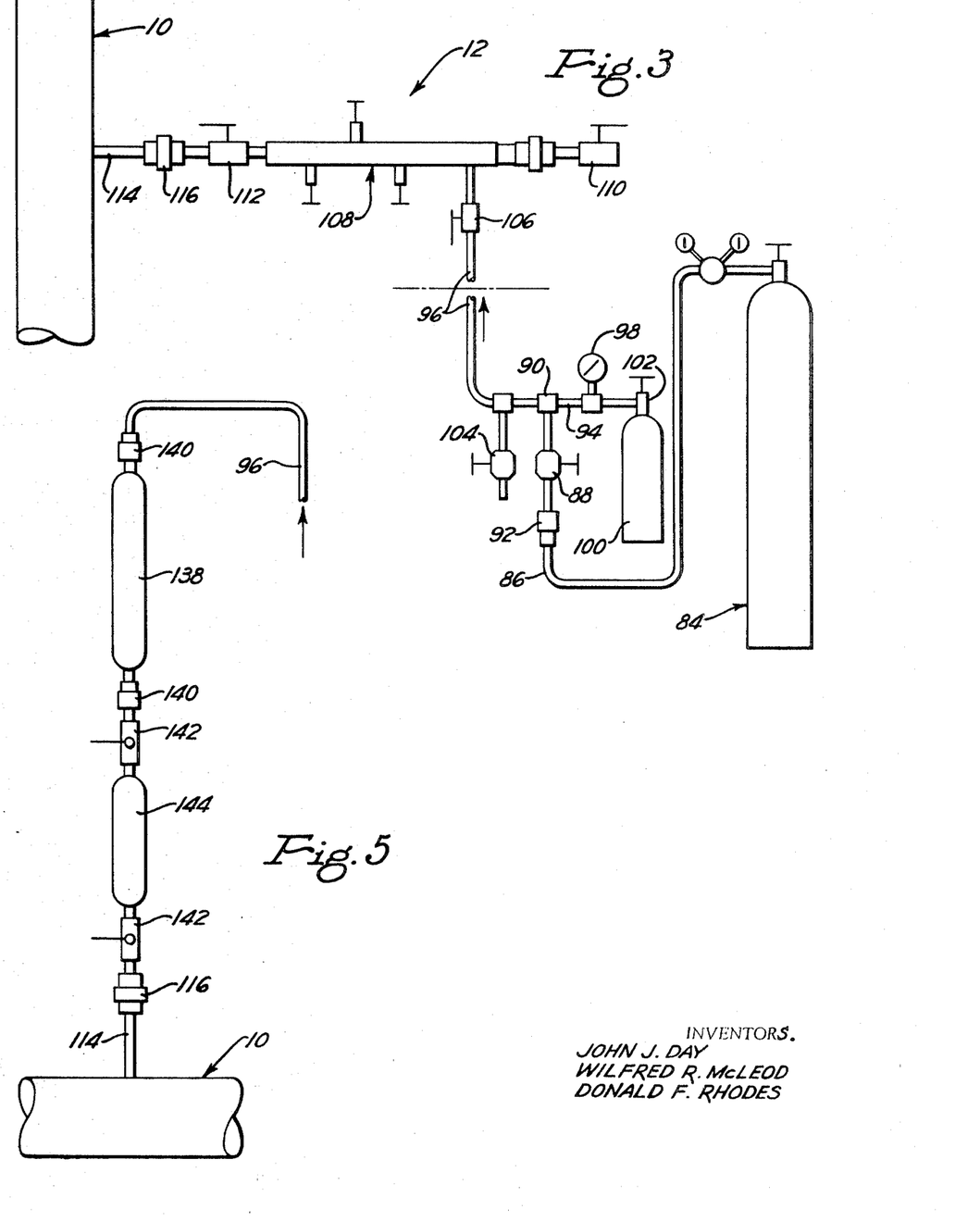
FIG. 3 is a somewhat schematic view of the gaseous tracer injection system.
FIG. 5 is a view similar to FIG. 3 showing the liquid tracer injection system.
Figure 4:
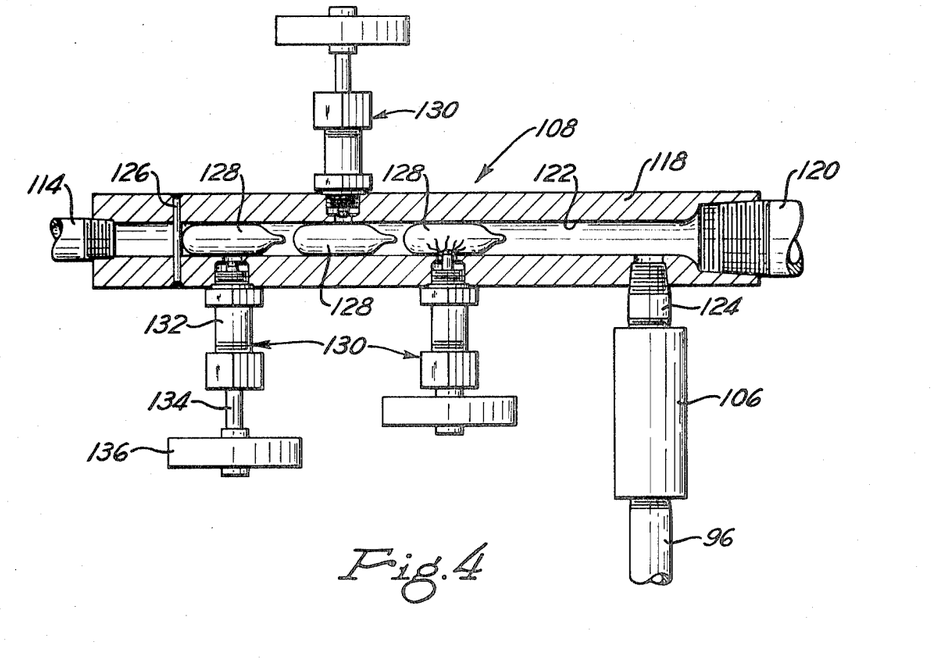
FIG. 4 is an enlarged view of part of the gaseous tracer injection system with some parts in cross-section and broken away.

Referring now to FIG. 3, a part of the injection means 12 is shown in detail, in particular, means to inject tracers in gaseous form. Ideally, it is most desirable to inject both or all tracers which are to be used simultaneously so that a true simultaneous measurement of all component velocities will be made. In the apparatus which has been built for test purposes, and which is shown in FIGS. 3 to 5, for two component streams, the two tracers were injected individually but virtually simultaneously by simply opening the two valves at the same time. The minute difference in injection times is negligible and in any case can be simply overcome in a finished embodiment for field use by providing a double action valve, a single solenoid to operate both valves, or the like means.

Referring now in detail to FIG. 3, the system comprises a source of driving gas 84, connected by a conduit 86, having a shut-off valve 88 therein, to a distribution manifold 90. The gas in tank 84 should be inert with respect to the components in the stream. Nitrogen was used in testing the invention with petroleum products. A snap acting coupling 92 is provided to permit removal of tank 84 after it has been utilized. Manifold 90 is of the three-way type with conduit 86 connected to one leg, a conduit 94 connected to a second leg, and a conduit 96 connected to the third leg. Conduit 94 includes a pressure gauge 98 and terminates at a small driving gas storage tank 100 which includes a throttling valve 102. A dual tank assemblage is provided to step down the pressure in large tank 84, to improve displacement efficiency, and to provide a more close control on the pressure of the injection driving gas via small tank 100 and valve 102. Conduit 96 includes a bleed valve 104 and a shut-off valve 106.

The end of conduit 96 feeds into a tracer gas housing 108, which is shown in more detail in FIG. 4. One end of housing 108 is provided with a flushing valve 110, and the other end of said housing connects to a main tracer gas supplying valve 112. A nipple 114 connects into pipeline 10, and the end of the nipple is connected to main valve 112 by a union 116.

The overall operation of the gaseous tracer injection system shown in FIG. 3 is as follows. After the tracer gas is put into tracer housing 108 and all the various conduits and valves, all closed, are assembled as shown in the drawing, valves 88 and 102 are opened so that small tank 100 will be charged from large tank 84 to the pressure desired for the test. Valves 88 and 102 are then closed, and large tank 84 can be removed as desired at snap coupling 92. The tracer housing is then prepared to release the tracer gas as will appear immediately below. Valve 106 is then opened and the system is ready for injection. The tracer will be injected, when other conditions are ready, by operation of valve 112. If desired, after tracer injection, the tracer housing may be flushed by closing valve 106 and opening valves 112 and 110 momentarily. Similarly, the gas supply system may be flushed by opening valve 104.

Referring now to FIG. 4, the gas tracer housing 108 is shown in detail. Housing 108 comprises a tubular body 118 threaded at one end to receive the nipple 114, and suitably threaded at its opposite end to receive a nipple 120 to attach it to flush valve 110. Between its ends, body 118 is formed with a through opening 122 of predetermined diameter. Nipple 124 connects conduit 96 and shut-off valve 106 therein to opening 122 adjacent the end thereof containing nipple 120. The flushing end 120 of the housing is enlarged with respect to the normal outlet end 114 to allow flushing out of the broken pieces of the ampules, and help insure a complete sweep of the tracer gas.

Means are provided to release the radioactive tracer gas, when needed, out of housing 108. To this end, a thin pin 126 is provided in body 108 bridging opening 122 adjacent the outlet end of the housing, adjacent nipple 114. One or a plurality of sealed ampules 128 are loaded into opening 122 when the apparatus is assembled prior to a test. The ampules 128 are preferably made of quartz because this material is more resistant to breakage during handling, it is not subject to radiation damage, it does not become highly radioactive, and also because it is substantially completely transparent to the radiations used from a reactor to make the gas sealed therein radioactive. Glass becomes very brittle upon being irradiated, and other materials which become radioactive would create handling problems. The ampules are of a suitable diameter to fit snugly within opening 122, and of predetermined length so that they will align with the ampule breaking means described below. The capacity of each ampule is also controlled and known in order to control the activity upon injection, and to stay with legal limits as to radioactivity. In the successful tests of the invention Argon was sealed into the ampules, and the ampules sent to a large atomic reactor nearest the area in which the test was to be run. Upon being irradiated, argon 41 was created, but this material has a half-life of only 1.83 hours. Total time to run a test varied from about 2 to about 30 minutes. Therefore, it is readily apparent that timing must be considered, particularly when using radioactive tracers having relatively short half-lives. Proper scheduling, and/or utilizing tracers, dependent upon the nature of the components, which have longer half-lives, simplifies this aspect of the method of the invention. As to the liquid tracer used in the successful tests, bromide 82 has a half-like of about 36 hours, which is long enough not to cause any serious scheduling problems, and at the same time short enough not to create any serious residual activity contamination problems.

Each ampule breaking means 130 comprises a housing 132 secured in a suitably formed threaded opening in body 118 so as to align with an ampule 128. A breaking pin 134 passes through housing 132, and is provided with hand operating means 136 at one end thereof, which may simply comprise a hand wheel. Sealing gasket means and cooperating operating threads are provided between pin 134 and housing 132, but are not shown. As will be obvious to those skilled in the art, the entire assembly 130 may be easily made or lifted wholly from commercially available hand operated valves.

In operation, the ampules loaded in opening 122 seat against pin 126 under pressure from the driving gas in conduit 96, all the breaking pins 134 being withdrawn at that time. Just prior to operation of valve 112 to release the tracer gas, the pins 134 are operated to break all the ampules thus releasing the radioactive gas against closed valve 112 which will inject the gaseous tracer upon being opened, as described above. The broken quartz is taken out of the system by any suitable means during the next loading, such as with some added rejection means, or simply blowing them out using back pressure from the pipeline.

Referring now to FIG. 5, the means to inject the liquid tracer is shown in a figure similar to FIG. 3. Certain parts of the liquid system are identical to those of the gaseous tracer system described above, and such parts are indicated by the same reference numerals used in FIG. 3. Essentially, the part of the apparatus between nipple 114 and conduit 96 is modified for liquid usage, and the rest of the apparatus from conduit 96 back to tank 84 is unchanged from the showing of FIG. 3, and is therefore omitted in FIG. 5. Line 96, coming in from the driving gas apparatus as shown in FIG. 3, connects to a supplemental high pressure cylinder 138 by means of a snap acting coupling 140, and the opposite end of said cylinder 138 is connected by another such coupling 140 to the inlet end of a valve 142. The other end of valve 142 connects to one end of a smaller high pressure cylinder 144 in which the radioactive liquid tracer has been charged. Another valve 142 serves to connect the outlet end of cylinder 144 to a nipple 114 and union 116 as used in the gaseous tracer system. The pair of valves 142 serve to isolate the cylinder 144. The manner of operation for injection of the liquid tracer is analogous to the description above concerning the gaseous tracer, with the exception that supplemental cylinder 138, known as a "tracer bomb," is filled with a liquid compatible with the liquid stream, and is used to flush the liquid tracer into the pipeline.

Referring back to FIG. 1 for reference, the above completes the description of the detectors 14 and the tracer injection means 12. The remaining portion of the invention concerns the instrumentation and the manner of handling the data produced. The remaining figures of the drawing and the following description describe various embodiments of the instrumentation 18. At the outset, a definition of terms may be helpful in order to clarify the teachings of the invention. The word "concentration" shall be understood to mean the amount of gamma rays produced by the radioactive tracers. Radioactive concentration is a function of the physical amount of tracer material injected into a component in the system, and is a function of the flow rate of that component through the system. The word "energy" or "radioactive energy" shall be understood to mean the amount of radiation energy emitted by each radioactive decay or the energy possessed by each gamma ray. The energy of the gamma rays emitted by any radioactive isotope is characteristic and unique to that isotope without regard to the concentration, as described above, of that isotope in the system.

There are two ways and a combination of the two ways by which to differentiate the two or plurality of radioactive tracers used in the invention. First, system component speed can be determined from the time it takes for the radioactive tracer to pass from one detector to another, the physical distance being known, and the energy level not being critical. This method is used where the speeds of the components are substantially different from each other. Secondly, system component speeds can be determined by difference in energy levels between the two tracers, and this system can be used even when the speeds of the components are more or less equal. Finally, a combination of the two concepts can be used to determine velocity.

A general statement which may be made at this point with regard to the electrical schematic diagrams of FIGS. 6 to 9 is that all the components shown are standard items, see table below.

Figure 6:
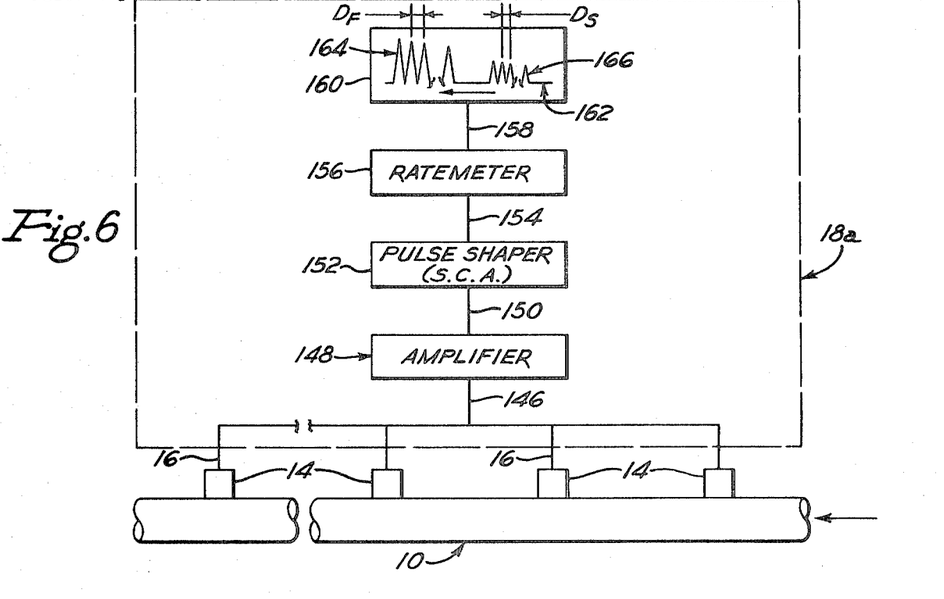
FIGS. 6 through 8 are schematic diagrams of different embodiments of the electronic instrumentation used to determine velocity and FIG. 9 is an electrical schematic diagram of part of the circuit of FIG. 8.

Referring to FIG. 6, the simplest method, a time based scheme, is illustrated. While the showing of the pipeline 10 and detectors 14 has been copied from FIG. 1, it will be understood by those skilled in the art that the system can be used with only two detectors. A plurality of detectors is desirable in order to get a profile of velocity over a longer length of the pipeline. Time based velocity determination pre-supposes that the speed of the components to be measured through the pipeline are markedly different from each other. The supposition is valid in many cases. For example, in a pipeline carrying gaseous and liquid petroleum products it is known that the gaseous products proceed through the pipeline at a much faster rate than the liquid products, a difference in speed on the order of seven to one is known.

The cables 16 from the detectors 14 are shorted together by a line 146 upon entering this first embodiment 18a of the instrumentation. The signals from the individual detectors are electrically tied together in this way as a matter of convenience, and to minimize the amount of equipment required. In dealing with radioactive tracers, the detectors pick up a single atomic decay at a time, and the timing and lengths of time involved are of the orders of magnitude of microseconds. Each individual decay detected by each detector produces a single "count" or pulse on each cable 16. Further, the energy produced by each decay is characteristic of that isotope, as described above. Thus, tying the detectors together introduces no appreciable error, because even though simultaneous decays can coincidentally occur resulting in a loss of count, this kind of coincidence has been found to be statistically negligible. Thus, the result is essentially each decay or count picked up by each detector will be individually delivered or present on line 146.

Line 146 delivers all the counts picked up at the detectors, individually, to an amplifier 148 to condition each pulse for easier handling in the remainder of the circuitry. A line 150 connects the output of amplifier 148 to the input of a pulse shaper or single channel analyzer, hereinafter called an S.C.A. 152. S.C.A. 152 further conditions each amplified count for handling in the next component, a ratemeter 156 to which it is connected by a line 154. Ratemeter 156 sums or accumulates all the counts received, in an analog sense, and puts out a continuing varying voltage in a line 158 which is delivered to a recorder 160, or other suitable output display device. The varying voltage put out by the ratemeter 156 is analogous to counts received per minute, or other unit of time.

By way of example, a curve 162 is shown in conjunction with recorder 160, of the standard constantly moving chart and driven pen type, which illustrates a typical result in a gas/liquid system wherein the gas moves faster than the liquid. Curve 162 includes a first group of peaks 164 which are produced by the faster moving gaseous component, and a second group of peaks 166 produced by the slower moving liquid component. Each individual peak in each group of peaks is indicative of the tracer as it passes under each individual detector. Thus, each group of peaks is shown broken to show the undetermined number of detectors. The distances $D_F$ and $D_S$ indicated on the chart are proportional, with appropriate scaling for chart speed and detector distances, to the speeds of the faster and slower components, respectively. The fact that a single peak to peak distance is proportional to component velocity is the reason that only two detectors are the basic requirement.

Figure 7:
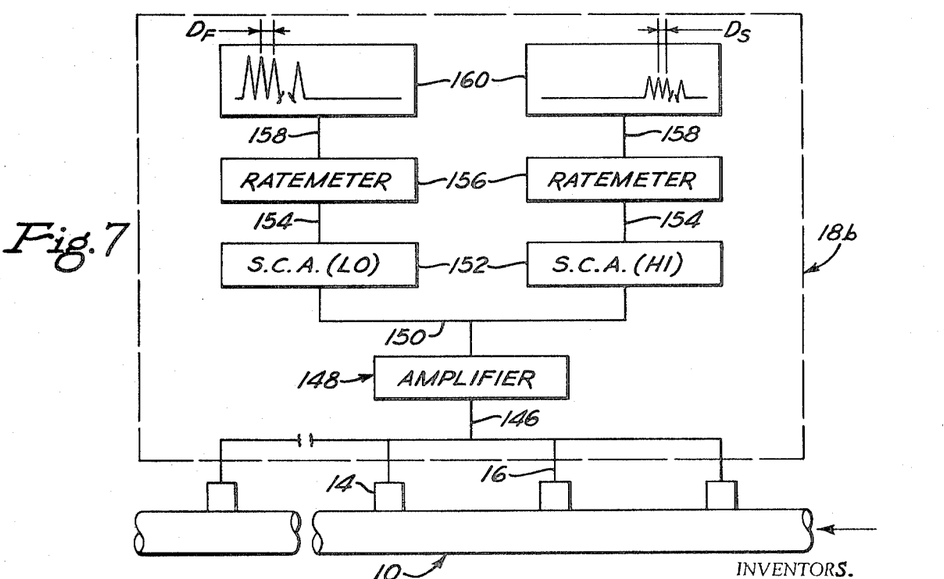

Referring now to FIG. 7, a second embodiment 18b of the instrumentation is shown in detail. The various individual components shown in FIG. 7 may be identical to those shown in FIG. 6 and described above, and therefore the same reference numerals are used, so far as possible, even though there are frequently two, rather than one, of each component used. The showing of FIG. 7 illustrates velocity measurement based on energy difference rather than on timing only.

The essential apparatus difference in the instrumentation 18b as opposed to FIG. 6 is that two instrument chains after the amplifier 148 are provided, with the S.C.A. 152 at the beginning of each chain being "tuned" or made selective as to a particular energy level. That is, the capability of an S.C.A. to act in the nature of a filter is utilized. Thus, the output on each of the records 160 is proportional to only one radioactive tracer. This system is more general than that of FIG. 6, because it will produce good results regardless of relative component speeds. That is, if in a two component system both components move at almost the same speed, the two speeds will be "sorted out" on the basis of the characteristic energy levels of the two tracers, and the discrimination is accomplished by the two tuned S.C.A.'s.

A third embodiment of the instrumentation, not shown, comprises a variation of the showing of FIG. 7, wherein a separate chain of an amplifier 148, high and low tuned, S.C.A.'s 152, and ratemeters 156, are utilized in conjunction with each of the plurality of detectors to drive a separate pen on multitrack chart recorders. A separate multi-track recorder is provided for each component. This system is the most expensive because of the equipment cost, but produces the most readily interpretable data. The curve produced by each pen is an analog of the radioactivity detected by each individual detector 14. Virtually all energy interferences are eliminated.

Figure 8:
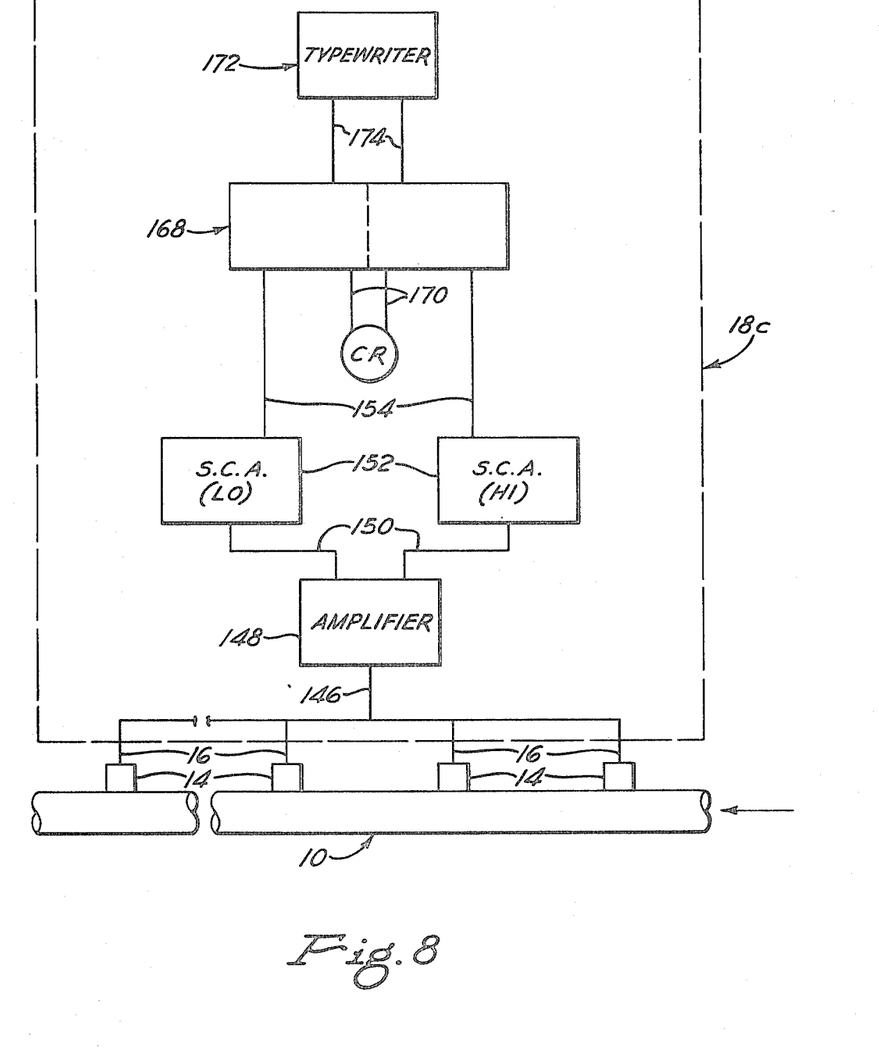

Referring now to FIG. 8, there is shown yet another embodiment 18d of the instrumentation. Parts described above carry the same reference numerals, as before. Embodiment 18c is a variation of embodiment 18b of FIG. 7 with the exception that means are provided to produce a digital output rather than an analog output. To this end, the memory portion of a relatively small commercial digital computer was utilized. The memory apparatus is indicated by the block numbered 168. Half or a part of the memory capacity is utilized for the lower energy pulses, and the remainder is utilized for the higher energy pulses, all in a manner described above in regard to FIG. 7, using the two tuned S.C.A.'s. An oscilloscope indicated by CR is connected to both halves of the memory 168 by a pair of lines 170. The cathode ray display is connected in the usual manner and is utilized for quick previews only. A second output device, in the form of an electric typewriter 172, is also connected to both memory halves or portions by a pair of lines 174. Note that the ratemeters 156 are not utilized in embodiment 18c in that, the mode of operation being digital, the pulses produced by the S.C.A.'s 152 are directly utilized.

The manner of operation of this digital embodiment is to permit memory device 168 to receive pulses for a short finite period of time, with all the pulses received in that time period being stored in a first memory location. After the first time period elapses, means are provided to shift to a second memory location and to store pulses in that second location for the same short finite period of time. Operation continues in this manner until the test is completed. Results may be monitored on oscilloscope CR, but after the test is run all the data stored in the entire memory is printed out on typewriter 172. The columns of numbers produced may be thought of as analogous to X and Y coordinates of an analog output, since each location number corresponds to the short finite period of time, or X coordinate, and each value at each location number corresponds to the Y coordinate. The result, however, is to a very much finer time scale than is physically possible with a pen and chart recorder.

However, frequently the velocity of one phase may exceed the velocity of the other phase by more than a factor of ten. Under these conditions, often a gas/liquid system, the gas phase radiotracer may flow past all of the detectors before the liquid radiotracer reaches the first detector. In this situation, it is possible to record all of the data in a single block of memory in a digital storage device. To do this it is necessary to scan the recorder memory initially at a very high rate during the time of passage of the fast radiotracer, and then change to a much slower scan rate during the time of passage of the slow radiotracer.

Additionally, the system is general, that is the difference in speed of the two tracers is immaterial since each decay of each kind of tracer is characteristic and is sorted out by the two S.C.A.'s 152.

It will be readily appreciated by those skilled in the art that the limitation on the system is dependent upon the number of memory locations in memory apparatus 168. In the apparatus which has been successfully built and tested, 512 memory locations were available, and 256 locations were provided for each portion.

Figure 9:
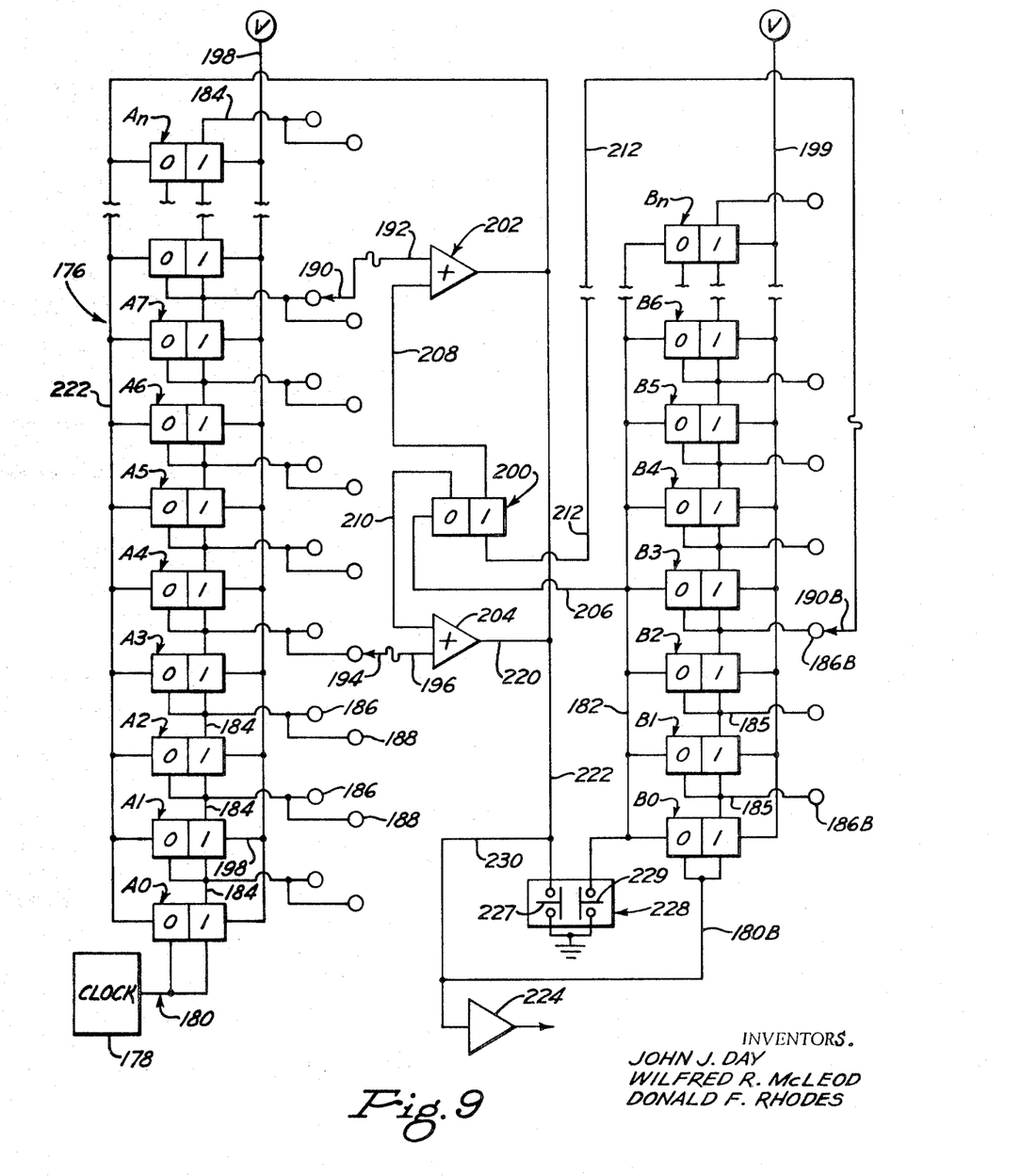

The memory location stepping apparatus provided by the manufacturer with memory apparatus 168 was replaced by the stepping circuit 176 of FIG. 9. Means are provided to supply two different sampling times, or times at which memory locations in one part of the memory 168 receives pulses as compared to the memory locations in the remainder. The purpose for doing this is that, as stated above, in many applications it is anticipated that a gas/liquid system will be under test wherein the gas moves substantially faster than the liquid. Thus, a shorter interval would be required at first, and, since the gas will probably be out of the system before the liquid enters and the liquid will be moving slower, a shorter sampling time for the liquid may be utilized. Further, sometimes the speed difference will be small and the tracers may overlap. The system of FIGS. 8 and 9 accommodates for these various cases by means of its flexibility, as will be pointed out below.

Referring to the drawing of circuit 176 in FIG. 9, a clock 178 provides pulses at a constant interval of time via a line 180. If desired, a clock which provides a variable pulse interval could be used. The essential elements of the circuit are a first array of flip-flops arranged in cascade numbered A0, A1, A2, etc., up to the last flip-flop An. The circuit also includes a second array of cascaded flip-flops indicated by B0, B1, B2, etc., up to the last flip-flop Bn. These two cascaded arrays shall be designated the A chain and the B chain, respectively. As is readily apparent, the A chain can include any number of flip-flops to achieve any length of time interval, period, equal to the clock interval times two raised to a power equal to the number of the flip-flop, as will appear more clearly below. Similarly, the B chain can include any number of flip-flops to achieve any number of repetitions equal to two raised to a power equal to the number of a selected flip-flop.

All the flip-flops in both the A and B chains, and the control flip-flop described below, are identical, and therefore only one flip-flop will be described in detail. A flip-flop is a solid state device in the nature of a double-throw switch, with the added capacities of "remembering" or holding a signal on either side, and of being reset to its initial condition. It is conventional in the art to refer to the two conditions in which the output of one side of a flip-flop could be as either the "1 state" or the "0 state," with the other side always being in the opposite condition. As used herein, the "1" state shall means ground potential, and the "0" state a voltage of about $-3$ volts. This nomenclature has been added to the drawings and will facilitate the following description. Another characteristic of a flip-flop depending on manufacturer, is that it will provide a signal or will conduct on the output of a particular side only when that side goes from a higher level to a lower level, or vice-versa. For example, referring to flip-flop A2, it will provide an output signal which will change the state of flip-flop A3 only when the right side of flip-flop A2 goes from the 0 state to the 1 state, that is, when the voltage goes from $-3$ volts to ground, a positive going pulse. The flip-flops used in the apparatus built to test the invention operate with positive going signals, but other apparatus could be built to work with negative going signals, as will be obvious to those skilled in this art.

Flip-flops consume power and are connected to a power supply. The power supply portion of the circuit of the invention is not shown in full detail in that it is conventional as is understood by those skilled in the art. However, some parts of the power supply are shown, for convenience and reasons which will appear below, and these connections are indicated on the drawing by the notation of a V enclosed in a circle. It will further be understood in regard to the power supply that each of the connections are electrically isolated from the others by the use of suitable means, not shown, such as current limiting resistors, Zener diodes, and the like.

All of the A and B chain flip-flops are arranged in the circuit so that they are normally in the states shown, i.e., left side at $-3$ or "0" state, right side at ground or "1" state. Means are provided to reset the flip-flops to these initial conditions initially prior to starting operation. The A chain is additionally reset during operation as will appear below. To this end, a line 222 having many branches, feeds the reset terminals on the A chain flip-flops and a similar line 182 serves to reset the B chain flip-flops. The two lines 222 and 182 terminate at a grounding switch 228 which includes a pair of manually operable, spring-loaded, normally open contacts 227 and 229 adapted to ground the lines 222 and 182, separately and respectively, which, via means in the flip-flops, sets them to the initial conditions shown. If the circuit is left idle for a period of time, the flip-flops could possibly "wander" into either state, which would cause a period of confused operation upon start-up. The grounding switch 228 is operated prior to putting the circuit into use so that all the flip-flops will be in their initial states as shown. Because of the particular nature of the flip-flops used, grounding at the initially 0 state side will cause the flip-flop to take the configuration shown, i.e., that side at $-3$ volts or 0 state.

Power is supplied to the A and B chain flip-flops by a pair of lines 198 and 199, respectively, and means not shown are provided to separately feed power to the other half of each flip-flop.

A composite connection 184 interconnects each two flip-flops in the A chain, and a similar composite connection 185 serves this same function in the B chain. Each connection 184 terminates in two contacts 186 and 188 and all the contacts 186 together comprise a set, any one of which may be contacted by a movable member 190. Similarly, all the contacts 188 form a set selectively contactable by a moveable member 194. Physically, a single multiple gang switch or similar device may be provided to permit selective cooperation between any one contact 186 and their member 190, and any one contact 188 and their cooperating moveable member 194. A single set of contacts is provided for the B chain, and comprises a set of contacts 186B cooperable with a member 190B.

The regular pulses from clock 178 delivered on line 180 to flip-flop A0 will first cause that flip-flop to change states, and the next clock pulse will cause it to change back to its original state. As mentioned above, the second clock pulse thus causes flip-flop A0 to produce its first right side positive going output pulse, 0 state to 1 state, which causes flip-flop A1 to change state for the first time via connection 184. Thus, each two pulses into any one flip-flop will cause one state change at the next higher flip-flop.

Thus, it can be seen that the clock pulses cascade up the A chain and are in effect counted therein. Any position of the movable member will receive a pulse once every period of time proportional to the clock's frequency times 2 raised to a power equal to number of the flip-flop at the output of which it is set. For example, contact 194, in the position shown, will conduct at a frequency having a period equal to the clock interval times $2^3$. Similarly, contact 190 will conduct at a frequency having a period equal to the clock interval times $2^7$. Referring to the B chain, signals are delivered to flip-flop B0 via line 222 and from control circuitry described below and the same logic with regard to the cascading and with regard to the one contact 190B, as described above with regard to the contacts 190 and 194, applies.

Control means are provided to interconnect the A and B chains and comprises an output line 230 interconnecting line 222, the B chain feeder line 180B, and an amplifier, a one-shot multivibrator, or other suitable device 224, the conditioned pulses from which are utilized to step from one memory location to another in memory apparatus 168.

The interconnecting or control means also comprises a pair of "and" gates 202 and 204, the outputs of which feed line 222. A line 192 interconnects movable member 190 and comprises an input to and gate 202. A line 196 in a similar manner, interconnects member 194 and gate 204. The lines 212, 192, and 196 are shown as having an indeterminate length so as to enable the respective moveable member to contact any one of all of the contacts of its cooperating set.

As is known, an and gate is a solid state device which will produce a signal at its output when there are signals on all in this case both, of its input lines. An and gate also inverts signals from its input across to its output. A pair of lines 208 and 210 comprise the second input to each of the two and gates 202 and 204, respectively, and the other ends of said lines are connected to each of the two sides of a control flip-flop 200.

A line 212 conducts the signal from movable member 190B to the input of the initial 1 state side of flip-flop 200. A line 206 conects to line 182 so that operation of initial conditions grounding switch 229 also sets flip-flop 200 to its initial condition, as shown.

In operation, the control flip-flop 200 enables one moveable member 194 on the A chain. That is, in the configuration shown, member 194 is enabled to effect the circuit because and gate 204 already has one of the necessary two inputs, line 210 having a signal on it. Clock 178 provides a pulse once every some time interval, that is, at the frequency built into the clock, for example, once every 10,000th of a second. Mathematically, frequency and period are reciprocals, and both terms are used somewhat interchangeably in this specification. For ease of reference below, let the clock interval be called X. Test results were not used in order that relatively small numbers could be used in this explanation. The principles of operation, however, are the same. In all modes, switches 227 and 229 are first operated momentarily to bring all the flip-flops to their initial conditions as shown.

Since all of the moveable members can be made to cooperate with any one contact of their respective sets of contacts, all references in the following examples to long counts or short counts or to particular numbers, or to particular frequencies or repetitions, are exemplative. Three differently numbered flip-flops, namely A3, A7, and B2 were purposely chosen to avoid confusion, but all of these are interchangeable. In summary, any moveable member can cooperate with any flip-flop on its associated cascaded array.

An output signal by either one of and gates 202 and 204 does three things: (1) each such signal is an output signal delivered to device 224 via lines 222 and 230; (2) each such signal is fed to the beginning of the B chain to operate the B chain in the same manner that clock pulses operate the A chain via line 180B; and (3) each such signal rests the A chain via the other end of line 222.

Upon initiation of clock pulses, a signal will be present at member 194 once every $2^3$ clock pulses, in the configuration shown in the drawing. Since the left half of flip-flop 200 is in the 0 state, a signal of −3 volts will be present on line 210 comprising one of the inputs to and gate 204. Upon the occurrence of eight clock pulses, a signal of −3 volts will be present on member or contact 194 and line 196, thus causing and gate 204 to conduct and putting out a signal on line 222. The signal on line 222 will comprise the first output signal on line 230 and to device 224, and will also reset the A chain. These pulses on line 180B will cascade up the B chain.

It is to be noted that the flip-flops require a positive going, 0 to 1, pulse to change states, but that the various and gates require two negative signals to produce a positive, actually ground potential, output signal. As mentioned above, an and gate is also an inverter. Thus, the clock frequency can be picked up directly. If member 194 were set on the lowest contact 188, between flip-flop A0 and A1, the very first clock pulse would cause the right side of A0 to go from 1 to 0 thus producing a −3 volt signal input to and gate 204 and an output pulse on line 222. Thus, it can be appreciated that the numbering of the flip-flops is significant, i.e., setting member 194 for the flip-flop A0 output produces the clock frequency as follows: $2^0 X = X$, where X is the period of the clock frequency, since two raised to the zero power equals one. Similarly, setting member 194 to the output of flip-flop A1 would cut the output frequency to half the clock frequency; the period would equal $2^1 X$ or 2X, since two raised to the one power equals two. Thus, the clock frequency, or one repetition can be used. Generally, any period, or number of repetitions, determined by raising two to a power equal to the number of the flip-flop can be obtained. Of course, the same logic applies to the numbering of the B chain flip-flops.

In operation, it is desired to supply, to output device 224, a predetermined number of pulses at a first frequency, then at least the same predetermined number of pulses at a second frequency. For example, first four pulses at a period of $2^3 X$, then at least four pulses at a period of $2^7 X$. The B chain is not reset during operation because the signals from the detectors are fed to the memory locations sequentially. In the actual tests, half the memory was used for the faster components, so the B chain was set to produce 256 repetitions. Thereafter, pulses continued to cascade up the B chain. It is not necessary to reset the B chain because only one cycle of operation is needed for each test. When the pulses delivered to the B chain cascade up to the last flip-flop B$n$, the B chain will automatically reset, and the pulses will again begin to cascade up the B chain from the beginning. Even if movable member 190B is set near the beginning end of the B chain, still at least the same number of repetitions, number of memory locations, will be provided in that pulses will continue to the end of the B chain and will thereafter start over again.

Different speeds of various components are accommodated by setting different frequencies on the A chain, in conjunction with the setting on the B chain. For example, if one component is very much faster than the second component, more than half the memory can be alloted to the faster component by changing the setting on the B chain, and a shorter time period provided on the A chain for the first period, and then a longer time period provided for the slower moving component for the remainder of the memory.

In the apparatus built in successfully testing the invention, the following commercial components were utilized.

| Component | Commercial Source | Model No. |
|---|---|---|
| Amplifier 148 | Nuclear data | 520 |
| S.C.A. 152 | do | 522 |
| Ratemeter 156 | Nuclear Chicago | 27301 |
| Recorder 160 | Varian | G14-A-1 |
| Memory 168 | Nuclear data | 1100 |

In apparatus which has been built in successfully testing the invention, all of the flip-flops, "and" gates, and the clock were obtained from Digital Equipment Corporation, their 100, 200 and 400 lines of solid state components. The other components, such as the various switches, multivibrator 224, and power supply not shown, are standard items, as is well known to those skilled in the art.

As is known, the response times of the various flip-flops and other solid state components is virtually instantaneous, on the order of $10^{-9}$ seconds, which is considered negligible with respect to the frequency of pulse production at clock 178, which at the fastest is of the orders of magnitude of $10^{-4}$ seconds. Thus it can be seen that the two frequencies at which output pulses are produced are a function of solely the number of flip-flops activated times X, the clock interval, and not the response times of the components utilized.

While the invention has been described in detail above, it is to be understood that this detailed description is by way of example only, and the protection granted is to be limited only within the spirit of the invention and the scope of the following claims.

We claim:

1. A method of substantially simultaneously determining the individual velocities of at least two components of a multicomponent stream moving in a vessel, comprising the steps of selecting at least two radioactive tracers each compatible with a selected one only of said at least two components in said stream, injecting said at least two tracers into the stream substanially simultaneously, securing at least two detectors to said vessel at known spaced distances along said vessel measured from the location of tracer injection, detecting the radioactivity of said tracers in said stream with said detectors, transmitting electrical signals from said detectors to instrumentation means, and producing output data from said instrumentation means proportional to the individual speeds of said at least two components.

2. The method of claim 1, wherein said at least two tracers are selected so that their radioactive energies are substantially different from one another, and wherein said output data is produced from said instrumentation means on the basis of said differences in energies of said tracers.

3. The combination of claim 2, wherein said output data is produced in analog form.

4. The combination of claim 2, wherein said output data is produced in digital form.

5. The combination of claim 1, wherein the speed of the slowest moving component of said at least two components is so much slower than the speed of the next slowest moving component of said at least two components that said next slowest moving component will have passed the last of said at least two detectors before said slowest moving component will have come to the first of said at least two detectors, and wherein said output data is produced from said instrumentation means on the basis of the elapsed times of passage of said tracers past said detectors.

6. The combination of claim 5, wherein said output data is produced in analog form.

7. The combination of claim 5, wherein said output data is produced in digital form.

8. Apparatus for substantially simultaneously dedermining the individual velocities of at least two components of a multicomponent stream moving in a vessel, at least two radioactive tracers each compatible with a selected one only of said at least two components in said stream, means to inject said at least two tracers into the stream substantially simultaneusly, at least two detectors secured to said vessel at known spaced distances along said vessel measured from said tracer injecting means, and instrumentation means connected to said detectors to produce output data proportional to the individual speeds of said at least two components from the signals supplied by said detectors.

9. The combination of claim 8, wherein said at least two components consist of natural gas and crude oil, and wherein said at least two tracers consist of radioactive argon-41 compatible with only the natural gas, and radioactive bromide 82 in bromobenzene compatible with only the crude oil.

10. The combination of claim 8, said tracer injection means including means to inject a radioactive tracer in gaseous form comprising a housing, a plurality of destructible ampules in said housing each containing a quantity of said radioactive gaseous tracer sealed therein, means to connect one end of said housing to said vessel with the space within said housing in fluid flow communication with said stream, means to supply driving gas under a pressure greater than the pressure within said vessel to the opposite end of said housing, and means operable from without said housing to break said ampules within said housing.

11. The combination of claim 8, said instrumentation means comprising at least one amplifier adapted to amplify the signals supplied by said detectors, at least one means to condition the signals put out by said amplifier, and at least one display means operatively cooperable with said signal conditioning means to produce said output data.

12. The combination of claim 11, said at least one amplifier consisting of a single amplifier adapted to receive all the signals from all of said at least two detectors, said at least one signal conditioning means consisting of a single pulse shaper, and said at least one display means comprising a ratemeter and a pen and chart recorder.

13. The combination of claim 11, said at least one amplifier consisting of a single amplifier adapted to receive the signals from all of said detectors, said at least one signal conditioning means consisting of a pair of single channel analyzers each tuned to filter out all energies except a respective one of the energies of said at least two radioactive tracers, and said at least one display means comprising two ratemeters and two pen and chart recorders, with each group of one ratemeter and one pen and chart recorder adapted to be driven by the output signals of each of said tuned single channel analyzers.

14. The combination of claim 11, said at least one amplifier consisting of a single amplifier adapted to receive the signals from all of said detectors, said at least one conditioning means consisting of a pair of single channel analyzers each tuned to filter out all energies except a respective one of the energies of said at least two radioactive tracers, said display means consisting of a digital memory apparatus adapted to store the pulses received from both said single channel analyzers in different memory locations within said memory apparatus, and said display means comprising a typewriter adapted to print out all data stored in said memory apparatus.

15. The combination of claim 14, and timing means cooperable with said memory apparatus, said timing means including a clocklike apparatus adapted to produce pulses at a constant, rapid predetermined rate and to feed memory location stepping signals from said timing means to the remainder of said digital memory apparatus which are a function of a variable factor of two of said clock pulses; said timing means providing said memory location stepping signals once every a first interval of time which is a first multiple of said clock pulses and that signal at that rate for a selected number of repetitions, and then providing said memory location stepping signals once every a second predetermined interval of time and that signal at that rate for at least said some selected number of repetitions.

16. The combination of claim 15, said timing means comprising a first and a second array of flip-flops, means to feed said clock pulses to said first array of flip-flops, a control flip-flop and a pair of "and" gates interconnecting said first and second arrays of flip-flops, means to feed said clock pulses to one end of said first array of flip-flops, said first and second arrays of flip-flops being so interconnected that each flip-flop in each of said arrays will change states once after the flip-flop immediately below it has changed states twice, first and second arrays of contacts connected in parallel circuit to each of the flip-flops of said first array of flip-flops and adapted to produce a signal when the same selected side of each of said flip-flops is conducting, first and second moveable members operatively cooperable with each of said first and second arrays of contacts respectively, means to interconnect said first moveable member with the input side of one of said pair of "and" gates, and means to interconnect said second moveable member with the input side of the second of said pair of "and" gates, each of said "and" gates having two inputs, the second input to each of said "and" gates comprising a signal from a respective side of said control flip-flop, an output line on each of said flip-flops; a main output line to feed said memory location stepping signals to the remainder of said memory apparatus and interconnecting the output lines of said two "and" gates, the reset terminals of all of the flip-flops of said first array, and the input end of said second array of flip-flops; a third array of contacts each associated with the same one side of each of the flip-flops of said second array of flip-flops, a third moveable member associated with said third array of contacts, and means interconnecting said third moveable member with the control terminal of said control flip-flop, whereby said first and second array of contacts in cooperation with their respective moveable members determine said first and second intervals of time, and said third moveable member in cooperation with said third array of contacts determines said selected number of repetitions.

References Cited

UNITED STATES PATENTS 2,706,254  4/1955  Mithoff et al.

FOREIGN PATENTS 224,864  10/1959  Australia.

OTHER REFERENCES

Ellington, R. T., et al., How To Determine Gas Flow Rate With a Radioactive Tracer Pipe Line, Industry, October 1959, pp. 24–30.

RICHARD C. QUEISSER, Primary Examiner

J. K. LUNSFORD, Assistant Examiner

PO-1050
(5/69)

UNITED STATES PATENT OFFICE
CERTIFICATE OF CORRECTION

Patent No. 3,621,710          Dated November 23, 1971

Inventor(s) John J. Day, Wilfred R. McLeod and Donald F. Rhodes

It is certified that error appears in the above-identified patent and that said Letters Patent are hereby corrected as shown below:

Column 1, line 57, "matehmatics" should be --mathematics--.

Column 3, line 71, delete "end".

Column 6, line 39, after "a" insert --third way which is a --.

Column 7, line 14, before "each" insert --that--.

Column 8, line 11, "18d" should be --18c--.

Column 9, line 74, after "conditions" delete "initially".

Column 11, line 15, "conects" should be --connects--.

Column 11, line 50, "rests" should be --resets--.

Column 12, line 29, change "movable" to --moveable--.

Column 13, claims 3, 4, 5, 6 and 7, line 1 of each, change "combination" to --method--.

Signed and sealed this 12th day of December 1972.

(SEAL)
Attest:

EDWARD M. FLETCHER, JR.          ROBERT GOTTSCHALK
Attesting Officer          Commissioner of Patents